United States Patent [19]

Kantarian et al.

[11] 4,173,274
[45] Nov. 6, 1979

[54] CONVEYOR LOAD SHUNTING APPARATUS

[76] Inventors: Edward T. Kantarian, 4325 Arlington Dr., Royal Oak, Mich. 48072; Donald F. Staub, 814 Fox Run Dr., Bloomfield Hills, Mich. 48013

[21] Appl. No.: 883,879

[22] Filed: Mar. 6, 1978

[51] Int. Cl.$^2$ ............................................. B65G 47/46
[52] U.S. Cl. .................................. 198/367; 198/442; 198/599; 198/637
[58] Field of Search ................ 198/367, 599, 637, 442

[56] References Cited

U.S. PATENT DOCUMENTS

| | | | |
|---|---|---|---|
| 3,006,457 | 10/1961 | Weiss | 198/367 |
| 3,983,988 | 10/1976 | Maxted et al. | 198/367 |
| 4,077,506 | 3/1978 | Schlottmann et al. | 198/367 |

FOREIGN PATENT DOCUMENTS

| | | | |
|---|---|---|---|
| 67674 | 6/1940 | Czechoslovakia | 198/367 |
| 1071587 | 12/1959 | Fed. Rep. of Germany | 198/367 |

*Primary Examiner*—Joseph E. Valenza
*Attorney, Agent, or Firm*—William T. Sevald

[57] ABSTRACT

Conveyer load shunting apparatus having a housing with a main shaft equipped with a radial shunt bar extending over the conveyer to divert a load traveling on one conveyer to another. A lever on the main shaft is swung by a solenoid via a push-pull rod to swing the shunt bar from neutral to a shunting position. A spring biases the shunt bar to neutral and the solenoid armature extended. A horizontal rocker bar extends from the housing into the conveyer and has a radial leg equipped with a load engaging wheel. A spring and a radial switch bar on the rocker shaft biases the rocker shaft angularly to swing the wheel to a neutral position below the conveyer. A radial blocker arm on the rocker shaft has an end which is engageable with a peg on the lever of the main shaft to block the angular position of the main shaft with the shunt bar in shunt position. Thus the weight of the load holds the apparatus in shunt position with no strain on the solenoid. Upon the load moving off the wheel, the rocker shaft moves angularly to unclock the peg on the lever of the main shaft and the main shaft is spring biased to swing the shunt bar to neutral and move the armature to its extended position. An air cylinder may be substituted for the solenoid.

5 Claims, 8 Drawing Figures

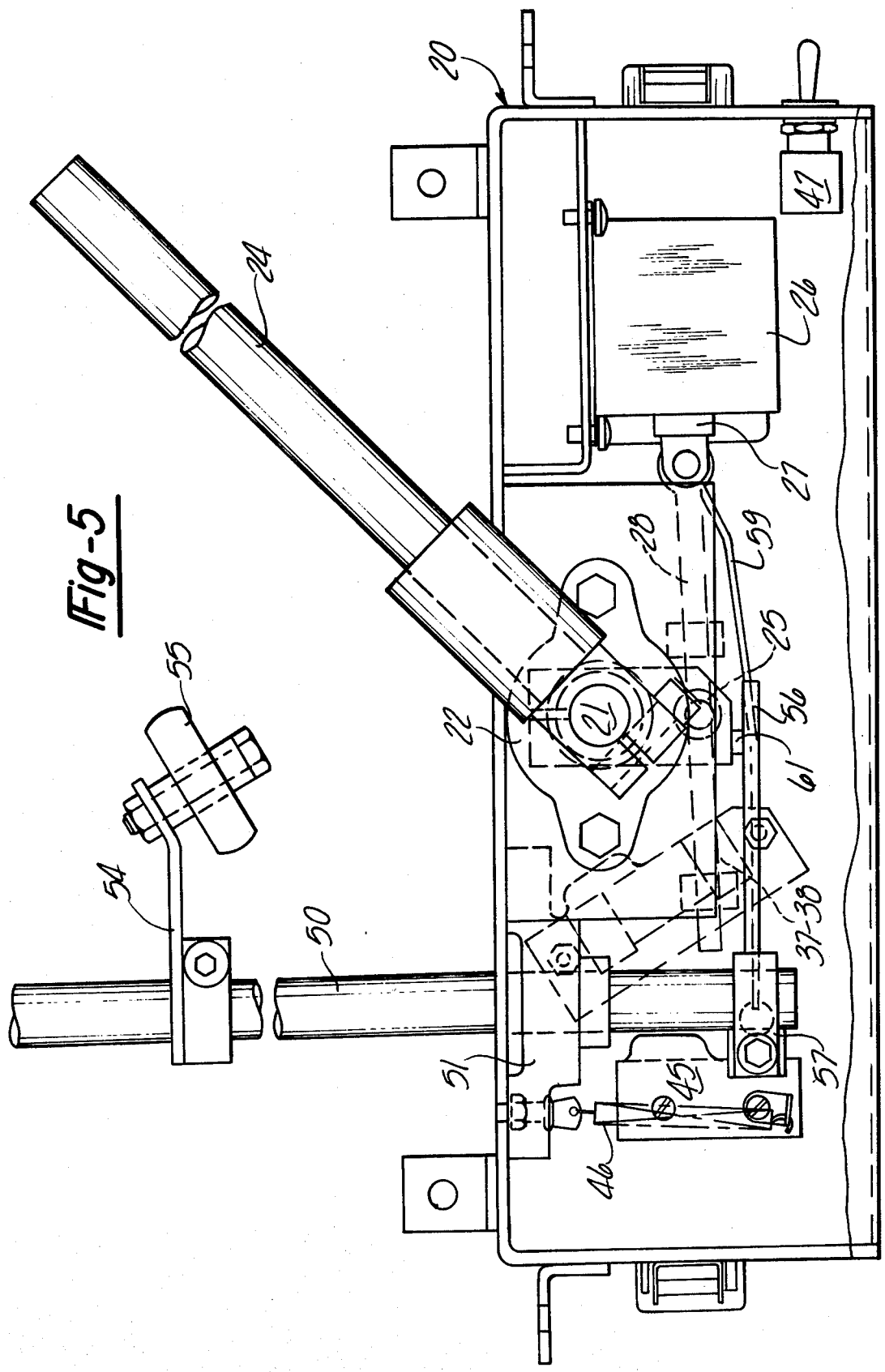

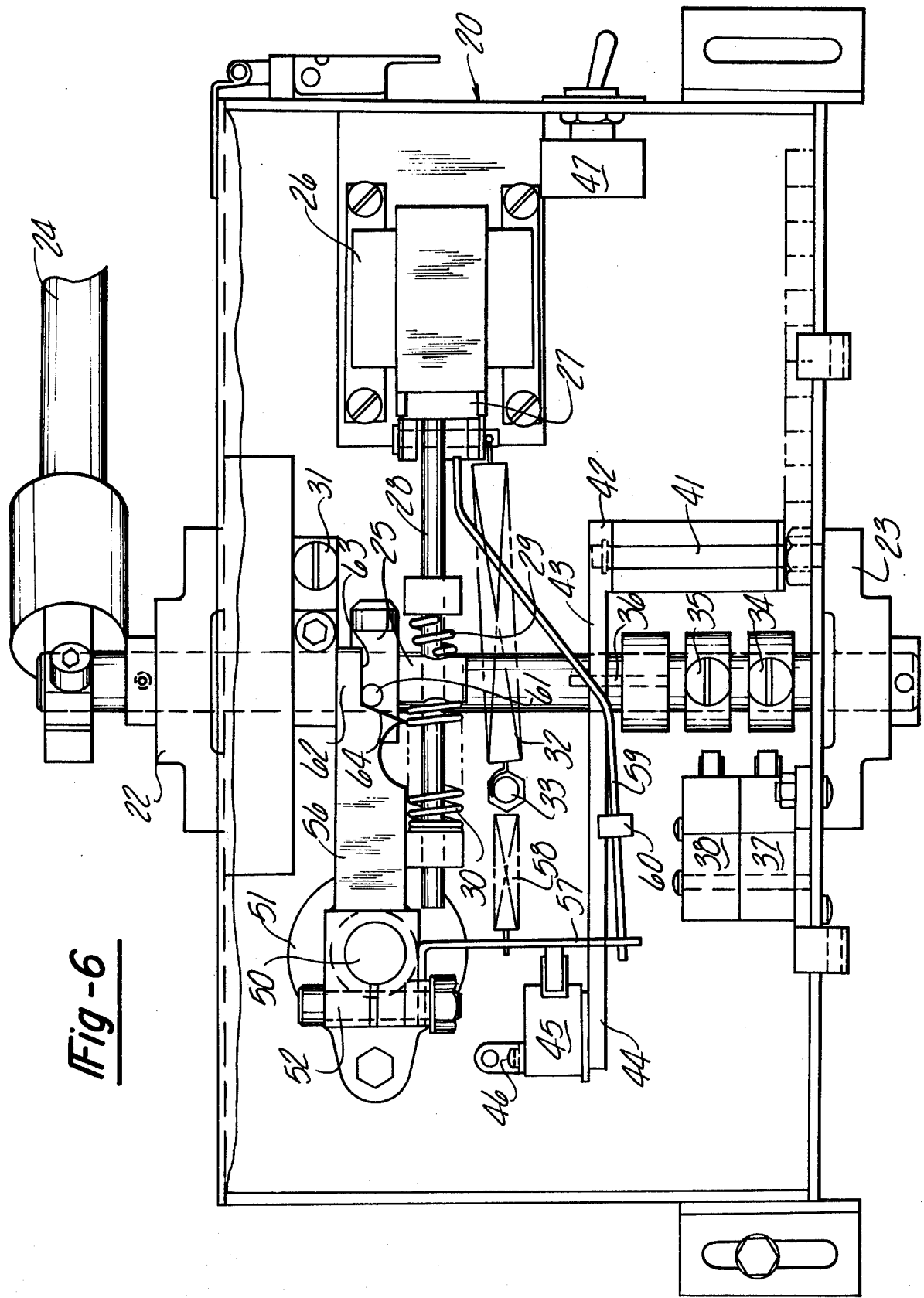

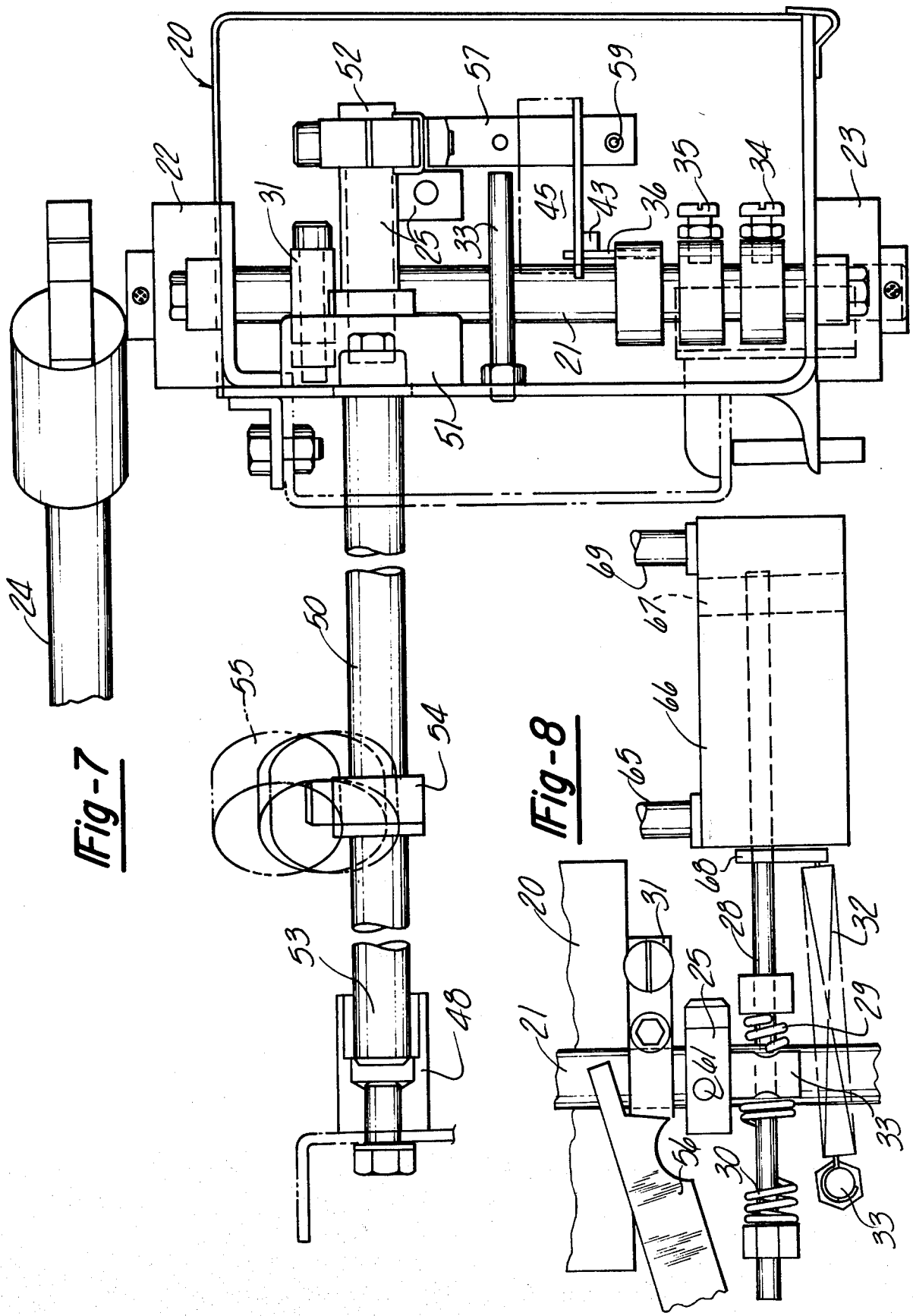

CONVEYOR LOAD SHUNTING APPARATUS

BACKGROUND OF THE INVENTION

Automatic conveyers are used extensively in industry, commercially, and in service operations such as the post office. The conveyers may be hundreds and even thousands of feet in length and carry their loads to various work stations, storage areas, etc. The conveyer system of the post-office type, used herein for explanation, has a primary or trunk line conveyer and secondary or shunt line conveyers branching off the primary conveyer. The primary conveyer usually leads from the point of reception of the bulk loads, past the work, processing and storage stations, to the point of exit of processed loads for shipment out of the installation. The primary conveyer usually runs continuously and thus the loads on it travel continuously. To work, process and/or store the loads, the loads must be shunted to the secondary conveyers where they can be handled without interference with the flow on the primary conveyer. Thus the secondary conveyers lead at an angle from the primary conveyer and the loads are shunted off the primary conveyer by a shunting device onto the secondary conveyer and again shunted back onto the primary conveyer by a shunting device after handling.

The shunting devices are usually electro-mechanical servomechanisms and various controls, air cylinders, signals, switches, solenoids, etc. are employed to activate the shunting devices at the right time for the right load moving onto or off the secondary conveyers. The automatic control system may be any suitable type to accomplish the desired end results.

The loads are usually heavy and more often very heavy and, since the conveyer drive is powerful, the impact of the loads on the shunting devices are very forceful and require very strong shunting devices to overcome the forces involved so that the loads are properly and reliably shunted and without the shunting devices breaking down or wearing out at an early time.

The usual prior art shunting device employs a very large and powerful solenoid or air cylinder to position, and, more importantly, to hold the shunting bar against the forces involved in diverting a heavy load traveling at a rapid rate from one to another conveyer. The weight and speed together with the change of direction builds up considerable momentum and inertia. The force of the diversion in shunting is thus borne entirely by the solenoids or air cylinders in the prior art devices. While mechanical advantage of various linkage is employed, it is usually insufficient as the action must be relatively quick and the advance to and retraction from the shunting position is by the same linkage. Thus the solenoids or air cylinders cannot be protected entirely by linkage and the strain on the solenoids or air cylinders cause them to wear out much faster than the rest of the automatic control system. This results in breakdown at the shunting stations and general havoc in the handling of the loads with jams, spills, breakage, and scattering resulting. It takes some time to replace a big solenoid or air cylinder and big solenoids and air cylinders are expensive. They also require more current and voltage or air pressure supply to operate than the other controls in the system, and thus supplemental wiring and lines is required. Moreover, the big solenoids or air cylinders cannot be replaced by the other low-voltage solenoids or small cylinders in the system so that a stock of big solenoids or air cylinders must be kept on hand or the station abandoned until one is obtained. The condition that the solenoid or air cylinder must resist the momentum and inertia of the force of the impact and of the shift of the load causes most of the trouble as the tug-of-war between the load and the energized solenoid or pressurized air cylinder tries to pull the armature out of the solenoid or the piston out of the cylinder while the EMF or air pressure tries to hold it in.

SUMMARY OF THE PRESENT INVENTION

With the foregoing in view, the solenoid or air cylinder of the novel conveyer load shunting apparatus of the present invention only swings the shunt bar from its neutral position to its shunting position. The term "solenoid" as hereinafter used also includes an air cylinder as equivalent. The solenoid may not be energized when the load is being shunted. There is no tug-of-war strain on the solenoid and it has long life without breakdown or malfunction. It is relatively small and inexpensive. It may be replaced by an ordinary solenoid usually found in conveyer systems. It works on the same low voltage and current of the rest of the control system. No extra higher voltage and higher current wiring is needed. No linkage with load imposed thereon is required to be operated by the solenoid. The freely movable unloaded linkage is actuated by the solenoid. The work of the solenoid in the novel apparatus is minimal.

The shunting apparatus of the invention has a housing containing the operating parts and which is mountable on a conveyer as a unit. The solenoid is mounted at one side of the housing. A push-pull rod is connected to its armature. The push-pull rod is connected to a lever on the main shaft. The solenoid thus moves the main shaft angularly by electro-mechanically moving the push-pull rod in one direction via the armature when the solenoid is energized. A spring attached to the armature moves the push-pull rod in the opposite direction. A shunt bar is carried by the main shaft and has a neutral position out of shunting condition. When the main shaft is angularly moved by the armature, the shunt bar is swung to the shunting condition.

Linkage also connected to the armature simultaneously moves a solenoid cut-out switch to an operable position, cocks a rocker shaft to an angular position raising a load contacting foot and wheel in the conveyer and raises a blocker arm for later activation. Upon the load running over the wheel on the rocker shaft, the rocker shaft is moved angularly in a reverse direction causing the blocker bar to engage a peg on the lever on the main shaft holding it in the angular position with the shunt bar in shunting condition and also swings a bar on the rocker shaft into contact with the cut-out switch which de-energizes the solenoid. The weight of the load on the wheel holds the apparatus in the shunting condition until the load is shunted by the shunt bar onto a secondary conveyer. Upon the load being shunted, the weight of the load moves off the wheel and the rocker shaft is free to move angularly under the power of a spring to swing the blocker bar out of blocking relationship with the peg on the lever on the main shaft which allows the return spring connected to the armature to pull the armature out of the solenoid.

With the outward movement of the armature, the push-pull rod pushes the lever on the main shaft to move the main shaft angularly to swing the shunt bar to its neutral position.

It is thus the weight of the load itself on the wheel that holds the shunt bar in shunting condition and not the solenoid.

The foregoing is described more fully in the detailed description hereinafter set forth taken in connection with the accompanying drawings now described.

DESCRIPTION OF THE DRAWINGS

FIG. 5 is a top plan view of the apparatus seen in FIG. 4 with some parts foreshortened and broken away.

FIG. 6 is a view similar to FIG. 4 showing the condition of the apparatus with return motion blocked by the weight of the load on the leg of the rocker bar holding the blocker arm on the peg of the lever thereby holding the shunt bar in shunting position and showing some parts schematically.

FIG. 7 is an end elevational view of the apparatus seen in FIG. 6 showing parts foreshortened and broken away and additionally showing a portion of the conveyer rail, an outboard bearing on the rail and indicating the various positions of the load engaging wheel on the leg of the rocker bar in broken lines; and FIG. 8 is a partial view of the apparatus, such as seen in FIG. 4, showing an air cylinder for swinging the shunt bar, and showing parts broken away.

DETAILED DESCRIPTION OF THE ILLUSTRATED EMBODIMENTS

Figure 1:
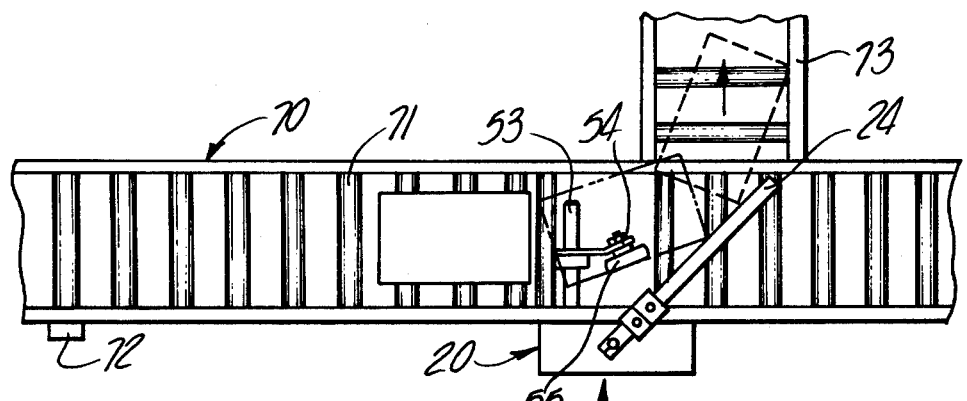
FIG. 1 is a diagrammatic top plan view of a primary conveyer and a secondary conveyer, both broken away, with the apparatus of the invention mounted on the primary conveyer with the shunt bar in shunting condition, showing a load on the primary conveyer in solid lines and indicating shunting of the load in broken lines.
Figure 2:
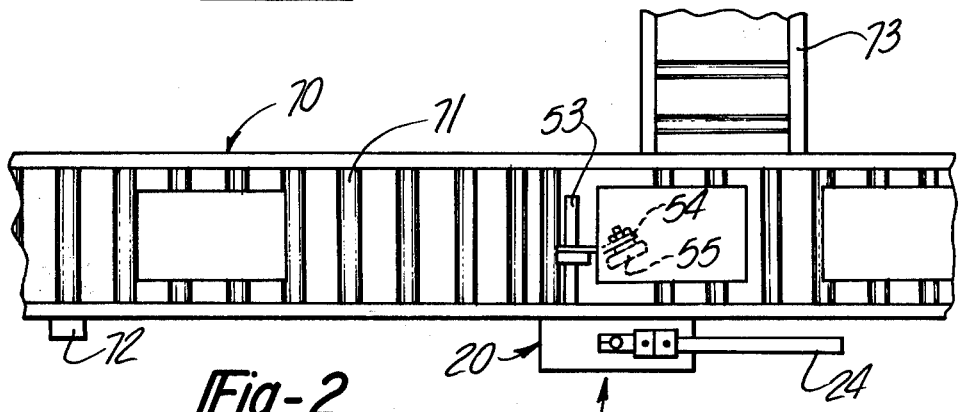
FIG. 2 is a view similar to FIG. 1 showing the shunt bar in a neutral position with the loads on the primary conveyer passing the apparatus.
Figure 3:
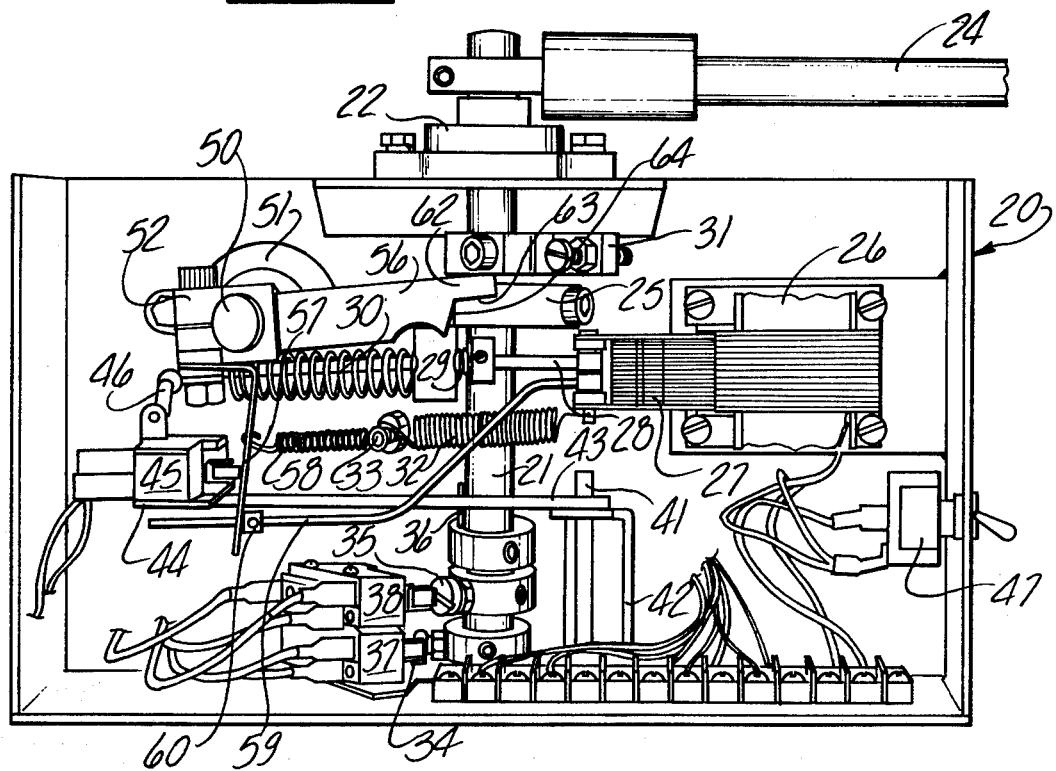
FIG. 3 is an enlarged elevational view of the apparatus with the back cover of the housing removed showing the unactuated condition of the internal components, such as seen in the direction of the arrow 3 of FIG. 2, with the shunt bar at neutral.

Referring now to the drawings wherein like reference numerals refer to like and corresponding parts throughout the several views, the illustrated exemplary embodiment of the invention shown therein comprises a housing 20, FIGS. 1-3. A main shaft 21 is vertically positioned in the housing 20. Bearings 22 and 23 on the housing 20 rotatably support shaft 21 at either end. A radial shunt bar 24 is mounted on the main shaft 21 above the housing 20 and the top bearing 22. A lever 25 is angularly adjustably clamped on the main shaft within the housing 20. A solenoid 26 is mounted on the housing in alignment with the lever 25. An armature 27 lies in the solenoid 26. A push-pull rod 28 is connected between the armature 27 and the lever 25. Cushion spring 29 and cushion spring 30 resiliently cushion the rod 28 and armature 27 relative to the lever 25. An adjustable stop 31 on the main shaft 21 is adaptable to abut the housing 20 at the end of desired angular motion of the main shaft 21 and the position of the shunt bar 24 when moved by the solenoid 26. A tension spring 32 is connected at one end to a projection 33 on the housing 20 and at the other end to the armature 27 to move the armature 27 to its de-energized position outwardly of the solenoid 26 and to thereby swing the lever 25, the main shaft 21, and the shunt bar 24 to the neutral position with the shunt bar 24 out of shunting condition.

A bottom button cam 34, an intermediate button cam 35, and a top pin cam 36 are carried by the main shaft 21 adjacent the bottom of the housing 20. A first optional switch 37 is based on the bottom of the housing 20 for actuation by the bottom button cam 34. A second optional switch 38 is based on the first optional switch 37 for actuation by the upper button cam 35. The button cams 34 and 35 are angularly adjustable on the main shaft 21 and the switches 37 and 38 may be normally closed or open as desired. The optional switches 37 and 38 and the button cams 34 and 35 are provided for signaling the condition of the shunt bar 24 up and down stream of the location of the apparatus on a conveyer for advising the shunting and/or non-shunting condition of the shunt bar 24 and/or for coordinating the actuation of other controls with the condition of the apparatus.

A stem 41 extends upwardly from the bottom of the housing 20 between the main shaft 21 and the solenoid 26. A clevis-hub 42 is pivotably mounted on the stem 41. A swing rod 43 is fixed on the clevis-hub 42 and extends past the main shaft 21 and the top pin cam 36 to a remote end 44 adjacent the left side of the housing 20. A normally closed solenoid cut-out switch 45 is mounted on the remote end 44 of the swing rod 43. A second tension spring 46 has one end connected on the front of the housing 20 and its other end connected to the cut-out switch 45 to resiliently urge the cut-out switch 45, and the swing rod 43 to a neutral position adjacent the front of the housing 20. When the solenoid 26 is energized and swings the main shaft 21 via the push-pull rod 28 and lever 25, the top pin cam 36 engages the side of the swing rod 43 and swings the swing rod 43 to move its remote end 44 and cut-out switch 45 thereon against the second tension spring 46 away from its neutral position adjacent the front of the housing 20 to any engagement point spaced from the front of the housing 20. The cut-out switch 45 is wired in series in the solenoid 26 circuit so that upon opening of the cut-out switch 45, the solenoid circuit is interrupted and the solenoid 26 is de-energized. A test switch 47 may be wired in parallel to the solenoid 26 for testing the operation of the apparatus.

A rocker shaft 50 lies in the left side of the housing 20. A bearing 51 pivotably supports the rocker shaft 50 on the housing 20 at about the height of the solenoid 26. The rocker shaft 50 extends inwardly of the housing 20 to its inner end 52 and extends outwardly of the housing 20 to its outer end 53, FIGS. 2, 5 and 7. When the housing 20 is mounted on a conveyer, the outer end 53 extends between the rolls of the conveyer and lies below their top load carrying surface. A radial leg 54 is adjustably clamped on the rocker shaft 50 between the housing 20 and its outer end 53. The outer end 53 may be supported by a bearing 48 on the conveyer if desired.

A wheel 55 may be carried by the radial leg 54 for rolling contact with loads passing by the conveyer. A blocker arm 56 is angularly adjustably clamped on the rocker shaft 50 at its inner end 52. A radial bar 57 extends downwardly from the blocker arm 56. A tension spring 58 is connected at one end to the projection 33 and at its other end to the bar 57 spaced from the rocker shaft 50. A push-rod 59 extends from the solenoid armature 27 and slidably extends through an aperature in the radial bar 57. A boss 60 on the push-rod 59 abuts the radial bar 57 under certain conditions. Thus the push-rod 59 does not pull the radial bar 57 angularly but only pushes it angularly against the spring 58 when the solenoid armature moves to its position outwardly of the solenoid 26. A peg 61 extends radially from the outer end of the lever 25 on the main shaft 21. An outer end 62 on the blocker arm 56 has a horizontal surface 63 and an inclined vertical surface 64 for co-action with the peg 61 on the lever 25 as later described. The apparatus has four conditions now described.

Referring now to FIG. 8, an air cylinder 66 and piston 67 are substituted for the solenoid and armature as previously described. The push-pull rod 28 is connected to the piston 67. Air pressure is supplied via the tube 65 to move the piston 67 to the energized position as shown which stretches the spring 32 attached to the push-pull rod 28 via the arm 68 and swings the lever 25 to move the shunt bar 24, not shown, to the shunt position. To extend the piston 67 and rod 28, the air pressure is removed from the tube 65 and it is vented to atmosphere allowing the spring 32 to extend the piston 67 and rod 28 with the open tube 69 providing a vacuum break.

(First or Neutral Condition)

The solenoid 26 is not energized and its armature 27 is extended by the tension spring 32 with the push-pull rod 28 locating the lever 25 and the main shaft 21 angularly to position the shunt bar 24 parallel to the conveyer 70 out of shunting relationship, FIGS. 2 and 3. The extension of the armature 27 extends the pushrod 59 against the bar 57 on the rocker shaft 50 against the tension spring 58 positioning the rocker shaft 50 angularly to locate the leg 54 and wheel 55 on the rocker shaft 50 below the top surface of the conveyer rolls 71. The top pin cam 36 is out of engagement with the swing rod 43 and the tension spring 46 retracts the cut-out switch 45 to the front of the housing 20 and thus out of alignment with the bar 57 on the rocker shaft 50. This condition obtains until the solenoid 26 is energized.

(Second or Solenoid Energized Condition)

Figure 4:
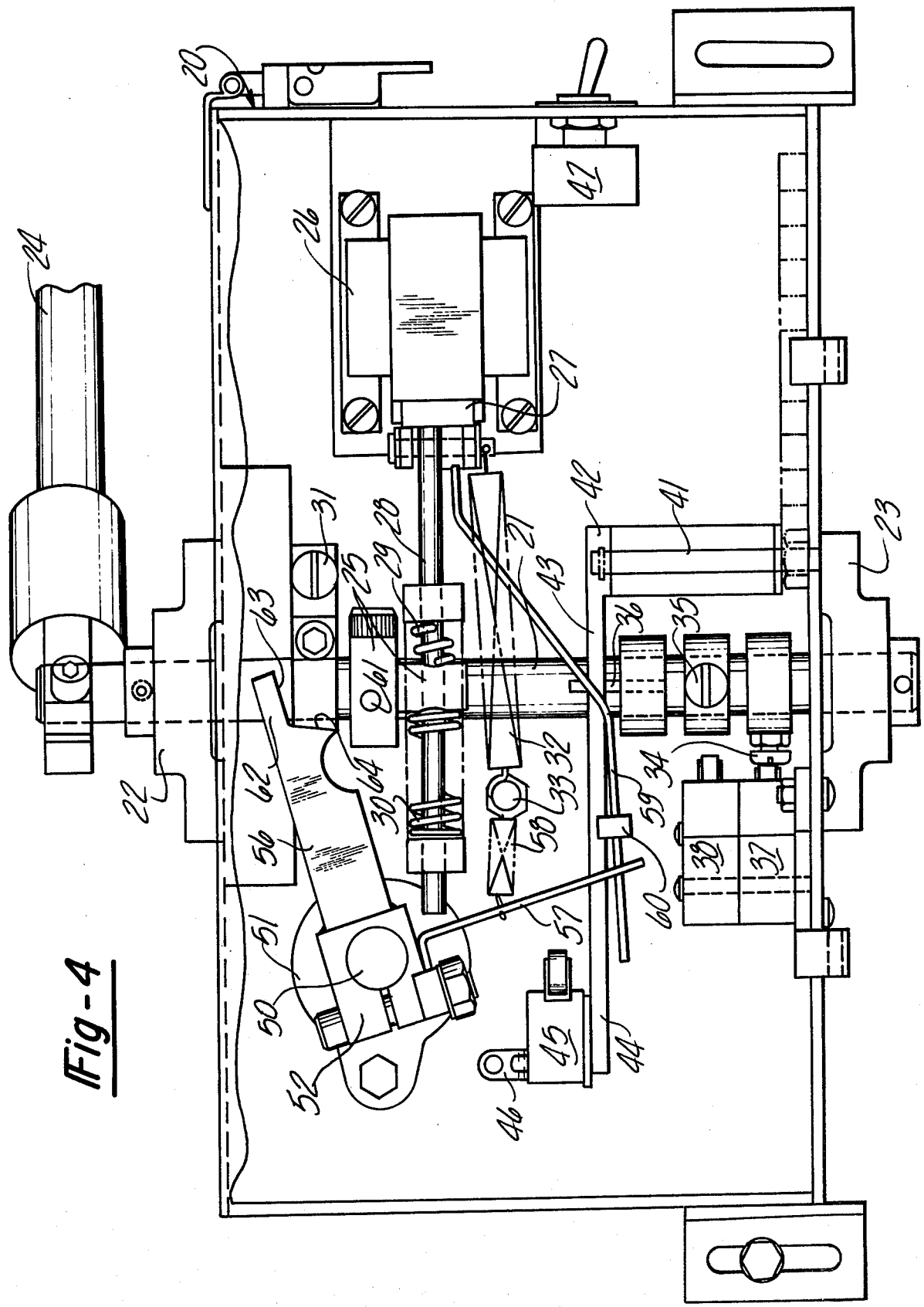
FIG. 4 is a further enlarged elevational view of the apparatus as seen in FIG. 3 in the actuated condition with the shunt bar in the shunting position such as seen in the direction of the arrow 4 of FIG. 1, showing some parts schematically, and illustrating the condition of the apparatus prior to the blocking of return motion effected by the weight of the load.

A normally open holding switch 72 in the solenoid circuit is positioned on the conveyer 70 upstream from the apparatus and located in a position to be engaged and closed manually or automatically, FIGS. 1 and 4. Upon the closing the holding switch 72, the solenoid 26 is energized and retracts the armature 27. This swings the lever 25 via the push-pull rod 28 moving the main shaft 21 angularly to swing the shunt bar 24 over the conveyer 70 at a shunting angle. Retraction of the armature 27 also withdraws the push-rod 59 and removes the boss 60 thereon from abutting the bar 57 whereupon the spring 58 swings the bar 57 moving the rocker shaft 50 angularly to swing the leg 54 upwardly to locate the wheel 55 thereon above the surface of the rolls 71 of the conveyer 70 and also swings the blocker arm 56 upwardly to a point above the peg 61 on the lever 25 but out of contact with it. Also when the main shaft 21 was angularly moved, the top pin cam 36 engaged the swing rod 43 and moved it in a direction away from the front of the housing 20 thereby moving the solenoid cut-out switch 45 to a position aligned with the bar 57 and lying in the path of its angular motion. This condition obtains until the load encounters and depresses the wheel 55 on the leg 54.

(Third De-energized and Blocked Condition)

When the load on the conveyer 70 depresses the wheel 55 and leg 54, FIGS. 6 and 7, the rocker shaft 50 is angularly moved and this swings the blocker arm 56 downwardly whereupon its horizontal surface 63 rests on the peg 61 on the lever 25 with the blocker arm 56 inclined vertical surface in blocking relationship to the peg 61 on the lever 25. The angular movement of the rocker shaft 50 also swings the bar 57 angularly into engagement with the cut-out switch 45 causing it to open the circuit of the solenoid 26 whereupon the solenoid 26 is de-energized, the upstream holding switch released. The spring 32 urges the armature 27 to move outwardly with the push-pull rod pushing against the lever 25 to swing the lever 25. However, since the horizontal surface 63 of the outer end of the blocker arm 56 rests on the peg 61 of the lever 25, the depending inclined vertical surface 64 of the outer end of the blocker arm 56 abuts the peg 61 and prevents further movement of the parts described, and particularly this prevents reverse angular movement of the main shaft 21. Thus the shunt bar 24 is held in shunting condition over the conveyer 70 even though the solenoid 26 is de-energized. The shunt bar 24 and the wheel 55 on the end of the leg 54 on the rocker shaft 50 are in close proximity.

The load on the conveyer 70 being shunted by the shunt bar 24 thus maintains the wheel 55 in its depressed condition holding the rocker shaft 50 in its angular position against the tension of the spring 58 which tends to raise the wheel by angular movement of the rocker shaft 50 and also to swing the blocker arm 56 upwardly out of blocking relationship against the peg 61 on the lever 25. Thus the weight of the load on the wheel 55 holds the apparatus in the shunting condition with the blocker arm 56 abutting the peg 61 until the load is shunted whereupon the load moves off the wheel 55.

(Fourth or Return Condition)

When the load moves off the wheel 55, FIGS. 2, 3, and 7, the spring 58 swings the bar 57 moving the rocker shaft 50 angularly in turn swinging the leg 54 and wheel upwardly, and importantly, swinging the blocker arm 56 upwardly out of engagement with the peg 61 on the lever 25 leaving it free to swing. Upon the lever 25 being free to swing, the tension spring 32 attached to armature 27 pulls it out of the solenoid 26 to its full extended position and this moves the lever 25 via the push-pull rod 28 back to its initial position and moves the main shaft 21 angularly to swing the shunt bar 24 to its neutral position parallel to the conveyer 70. Also upon the armature 27 being fully extended, the push-rod 59 is extended and its boss 60 engages the bar 57 on the rocker shaft 50 causing the bar 57 to swing and move the rocker shaft 50 angularly to swing the wheel 55 downwardly below the top surface of the conveyer rolls 71 out of the way of non-shunted loads traveling past the apparatus. This returns the apparatus to the first or neutral condition previously described.

OPERATION OF THE APPARATUS

Upon the holding switch 72 being closed, FIG. 4, the solenoid 26 is energized retracting the armature 27 which angularly moves the main shaft 21 via the push-pull rod 28 and lever 25 and swings the shunt bar 24 into shunting position over the primary conveyer 70. This moves the peg 61 on the lever 25 into alignment with the blocker bar 56. The retraction of the push-rod 59 by the retraction of the armature 27 allows the spring 58 to swing the switch bar 57 which angularly moves the rocker shaft 50 to swing the leg 54 and wheel 55 upwardly into load engaging position. The angular movement of the main shaft 21 has moved the pin cam 36 against the swing rod 43 to swing the swing rod 43 so that its end 44 puts the cut-out switch 45 in alignment with the switch bar 57. Angular movement of the main shaft 21 has pivoted the button cams 34 and 35 to change their positions thereby changing the conditions of the switches 37 and 38 from normal.

Upon the load on the conveyer 70 depressing the wheel 55 and leg 54, FIGS. 1, 6 and 7, the rocker shaft 50 is reversely angularly moved and this swings the blocker arm 56 into engagement with the peg 61 on the lever 25 blocking reverse movement of the lever 25 and reverse angular movement of the main shaft 21 preventing it from swinging the shunt bar 24 out of shunting position. When the rocker shaft 50 is reversely angularly moved by the weight of the load, it swings the switch bar 57 against the cut-out switch 45 causing it to open and de-energize the solenoid 26. However, the shunt bar 24 stays in shunting position as blocked by the blocker arm 56. When the solenoid circuit is opened the holding switch 72 is released and it opens.

When the load is shunted, FIGS. 1 and 3, it moves off the wheel 55 and leg 54. This allows the spring 38 to swing the switch bar 57 to move the rocker shaft 50 angularly to raise the leg 54 and wheel 55 and move the blocker bar 56 off the peg 61 which unblocks the lever 25 allowing the spring 58 to move the armature 27 out of the solenoid 26 with the push-pull rod 28 then swinging the lever 25 to move the main shaft 21 angularly to swing the shunt bar 24 to neutral.

The reverse angular motion of the main shaft 21 has repositioned the button cams 34 and 35 relative to the switches 37 and 38 respectively and they assume their normal condition. The reverse angular motion of the main shaft 21 has also moved the pin cam 36 out of engagement with the swing rod 43 and the spring 46 retracts the cut-out switch 45 out of alignment wih the switch bar 57.

The extension of the armature 27 by the spring 32, FIG. 3, has also extended the push-rod 59 and its boss 60 comes into contact with the shaft bar 57 and swings it causing the rocker shaft 50 to angularly move to swing the leg 54 and wheel 55 out of engaging position relative to loads on the conveyer 70. As the cut-out switch 45 has been moved out of alignment with the switch bar 57, this swing of the switch bar 57 does not contact the cut-out switch 45 to cause it to open and the solenoid circuit through the cut-out switch 45 stays closed.

This places the apparatus in the ready condition for the next shunting operation upon closing of the holding switch 72 by manual or automatic means.

While the various parts and components of the novel apparatus of the invention has been shown and described specifically, it will be understood that various adaptations, equivalents, and substitutions can be made for the shown and described elements such as a lobe or button cam may be substituted for the pin cam 36 and the arrangement and operation may be changed within the scope of the invention and appended claims which define the protective boundries of the invention.

We claim:

1. Conveyer load shunting apparatus comprising,
a housing mountable on a conveyer,
a main shaft pivotably mounted on said housing,
a radial shunt bar on said main shaft swung by pivotal motion of said main shaft between a neutral position and a shunt position,
a lever on said main shaft,
a peg extending radially from said lever,
an actuator mounted on said housing,
a moving element in said actuator,
a push-pull rod linking said moving element and said lever; when said actuator is energized said moving element retracts moving said main shaft angularly via said push-pull rod and said lever to swing said shunt bar from a neutral position to a shunt position over the conveyer,
a rocker shaft pivotably mounted on said housing having an inner portion within said housing and outer portion for projecting into a conveyer below the load surface of the conveyer,
a radial leg on said outer portion of said rocker shaft equipped with a load engaging wheel, and
a blocker arm on said inner portion of said rocker shaft for engaging said peg on said lever when said lever is swung by said actuator being energized;
upon a conveyer load being proximate to said shunt bar, the load depresses said wheel angularly pivoting said rocker shaft to swing said blocker arm into engagement with said peg preventing return angular motion of said main shaft thereby holding said shunt bar in shunting position so that the force of the shunting is borne by said blocker arm and taken off said actuator.

2. In apparatus as set forth in claim 1,
said actuator is a solenoid and said moving element is an armature
a pin cam on said main shaft,
a swing rod pivotably mounted on said housing leading past said pin cam to an outer end,
a cut-out switch on said outer end of said swing rod wired in series with said solenoid, and
a radial switch bar on said rocker shaft;
said angular movement of said main shaft by the retraction of said armature moving said pin cam against said swing rod to swing said cut-out switch into alignment with said switch bar;
the angular movement of said rocker bar caused by a load depressing said wheel also swings said switch bar on said rocker shaft against said cut-out switch to open said switch in the solenoid circuit to de-energize said solenoid so that said solenoid is neutral during the shunting of a load on a conveyer.

3. In apparatus as set forth in claim 1,
a radial bar on said rocker shaft having an aperture therein spaced from said rocker shaft,
a push rod attached to said moving element having an outer end in the aperture of said radial bar, and
a boss on said push rod in contact with said radial bar when said actuator is not energized and said moving element is extended to position said radial bar angularly to pivot said rocker shaft to swing said leg and said wheel below the load carrying surface of a conveyer.

4. In apparatus as set forth in claim 1, at least one button cam on said main shaft, and a switch adjacent said cam for actuation by said cam upon angular movement of said main shaft to produce a signal indicating the condition of the apparatus as set by the angular position of said main shaft.

5. In apparatus as set forth in claim 1,
said actuator is an air cylinder and said moving element is a piston;
said piston being connected to said push-pull rod;
and tubes for supplying air pressure to said cylinder and for venting said cylinder.

* * * * *